J. A. DYBLIE.
SIGNALING DEVICE.
APPLICATION FILED JAN. 20, 1921.
1,396,169.
Patented Nov. 8, 1921.
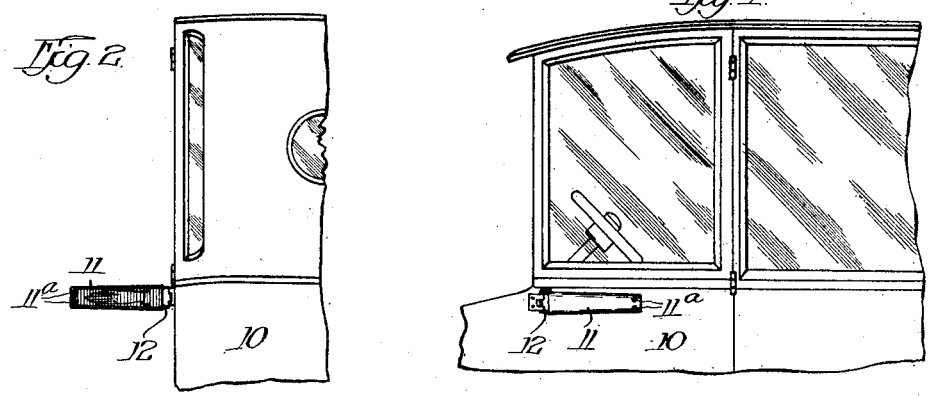
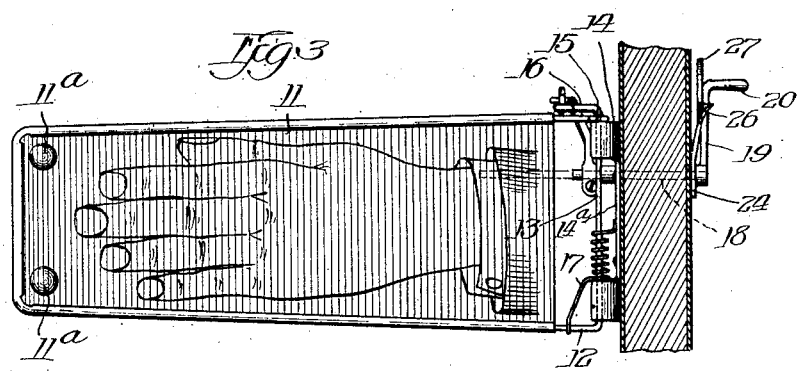
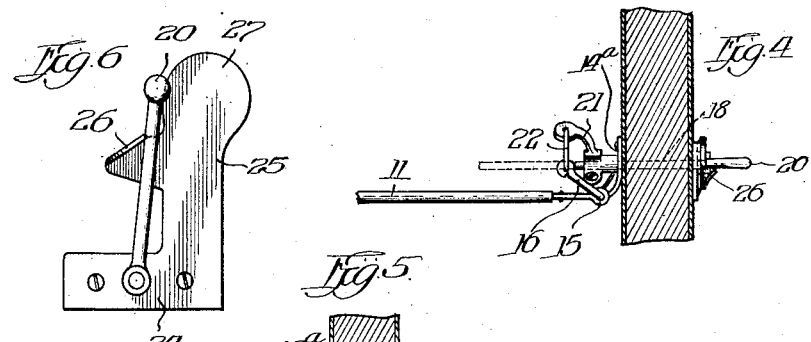
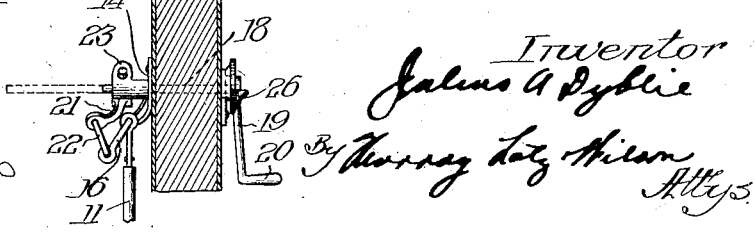

UNITED STATES PATENT OFFICE.

JULIUS A. DYBLIE, OF JOLIET, ILLINOIS.

SIGNALING DEVICE.

1,396,169.  Specification of Letters Patent.  Patented Nov. 8, 1921.

Application filed January 20, 1921. Serial No. 438,733.

*To all whom it may concern:*

Be it known that I, JULIUS A. DYBLIE, a citizen of the United States, and resident of Joliet, in the county of Will and State of Illinois, have invented certain new and useful Improvements in a Signaling Device, of which the following is a specification.

My invention relates to signaling devices and particularly to a novel signal adapted for use in connection with closed vehicles.

According to the law in a number of States it is required that a driver of a vehicle shall signal his intention to stop or turn. In open cars this is readily accomplished by extending the hand but in closed vehicles, such as coupes, sedans, etc., such action is difficult. One of the objects of this invention is to provide simple signaling means adapted for mechanical operation and so constructed as to enable its ready application to a vehicle without marring its appearance, and without extensive drilling or cutting of the sides thereof.

The invention will be more readily understood by reference to the accompanying drawings, in which, Figure 1 is a side elevation of a portion of an automobile body to which my signaling device has been applied, the device being shown in its closed position;

Fig. 2 is a view taken at right angles, the signal being shown in its extended position;

Fig. 3 is an enlarged view of the signaling device;

Fig. 4 is a fragmentary sectional plan view showing the signal in its extended position;

Fig. 5 is a similar view showing the signal in its retracted position; and

Fig. 6 is an elevation of a catch which I prefer to employ.

In the drawings it will be seen that the device is intended to be applied to the side 10 of a closed vehicle body. It may, if occasion requires, be applied to the door, as in some vehicles a door is located adjacent to the driver's seat. The device comprises a plate or wing 11 which may have a hand or other insignia disposed on one face thereof. The plate is stiffened at its edges by a wire 12 which surrounds the plate and projects beyond the inner end thereof, a vertical portion 13 of which is engaged by the apertured ears 14 of a bracket 14ª, adapted to be secured by screws to the vehicle body. The portion 13 is held at its upper end in an eye 15 formed in the terminal portion of the wire 12. The part 13 is then bent at right angles to form a crank 16 for oscillating the plate in its bearings. A spring 17 engages the plate and the bracket and tends to retain the plate in a position parallel with the side of the car body.

A shaft 18 projects through a transverse aperture in the car side and terminates at its inner end in a crank 19, having an operating handle 20. At its outer end the shaft has secured thereto a second crank 21, the free end of which is connected by means of the link 22 to the crank 15 secured to the plate. The crank 21 is held in position by means of an adjusting or clamping screw 23. In practice the shaft 18 is furnished sufficiently long to pass through a car side of the maximum thickness. When installed the shaft is caused to pass through a suitable opening in the bracket 14ª, the crank 21 is clamped in position snugly against the bracket and the shaft is cut off to proper length. Thus there are no portions of the device projecting outside of the vehicle side.

As a convenience in signaling I may prefer to provide a catch such as shown in Fig. 6, consisting of a strip of spring metal having a portion 24 adapted to be secured by screws to the car side and a portion 25 having a catch or hook 26 located in the arc of movement of the crank 19. In practice the crank 19 may be swung into the position of Fig. 6, thus projecting the plate 11, and retained in that position as long as desired. When the plate is to be returned to its normal position, a pressure exerted on the portion 27 of the catch will release the crank and permit the plate to return.

Obviously the construction is capable of considerable modification to the extent of varying the details and providing lighting facilities for night use if desired, and such modifications as are within the scope of my claims I consider within the spirit of my invention.

In order to prevent marring of the car side and to minimize the noise incident to the return of the signal to its inoperative position, I may provide rubber bumpers 11ª, held in a suitable manner in the plate 11.

I claim:

1. In a vehicle signaling device, the combination of a plate mounted for pivotal movement on the exterior of a vehicle body, a shaft extending through a side wall of the vehicle body, a crank at each end of said shaft, and a link connecting the exterior crank to said plate, whereby the plate is adapted to be swung by angular movement of the interior crank.

2. In a signaling device, the combination of a plate adapted for swinging movement on the exterior of a closed vehicle, a shaft extending transversely through a side wall of the vehicle body, cranks secured to each end of said shaft, one within and one without the vehicle, links connecting the plate to the exterior crank, spring means for retaining said plate in retracted position, and means engaging the interior crank for retaining the plate in open or projected position.

Signed at Joliet, Illinois, this 17th day of January, 1921.

JULIUS A. DYBLIE.